United States Patent
Prasad et al.

(10) Patent No.: US 12,545,467 B2
(45) Date of Patent: Feb. 10, 2026

(54) SYSTEM AND METHODS FOR REDUCING MULTI-CONTAINER PACKING ERRORS

(71) Applicant: KoiReader Technologies, Inc., Dallas, TX (US)

(72) Inventors: Ashutosh Prasad, Dallas, TX (US); Vivek Prasad, Bengaluru (IN)

(73) Assignee: KoiReader Technologies, Inc., Dallas, TX (US)

( * ) Notice: Subject to any disclaimer, the term of this patent is extended or adjusted under 35 U.S.C. 154(b) by 0 days.

(21) Appl. No.: 19/202,184

(22) Filed: May 8, 2025

(65) Prior Publication Data

US 2025/0263190 A1 Aug. 21, 2025

Related U.S. Application Data

(63) Continuation of application No. 18/825,078, filed on Sep. 5, 2024, now Pat. No. 12,330,832.

(60) Provisional application No. 63/583,115, filed on Sep. 15, 2023.

(51) Int. Cl.
| | |
|---|---|
| B65B 5/06 | (2006.01) |
| B65B 57/14 | (2006.01) |
| B65B 57/18 | (2006.01) |

(52) U.S. Cl.
CPC .............. B65B 57/14 (2013.01); B65B 5/06 (2013.01); B65B 57/18 (2013.01)

(58) Field of Classification Search
CPC ............ B65B 57/14; B65B 57/18; B65B 5/06
See application file for complete search history.

(56) References Cited

U.S. PATENT DOCUMENTS

| | | | | |
|---|---|---|---|---|
| 8,266,878 B2 * | 9/2012 | Luciano, Jr. | .......... | A61J 7/0084 |
| | | | | 53/473 |
| 8,683,777 B2 * | 4/2014 | Armington | .......... | B31D 5/0047 |
| | | | | 53/472 |
| 9,828,128 B1 * | 11/2017 | Linnell | .................... | B65B 57/00 |
| 10,035,616 B1 * | 7/2018 | Hood | ........................ | B65B 67/08 |
| 10,160,177 B2 * | 12/2018 | Wetsch | ............. | G05B 19/4155 |
| 10,227,171 B2 * | 3/2019 | Wetsch | ............. | G05B 19/41865 |
| 11,208,226 B2 * | 12/2021 | Ekambaram | ............ | B65B 57/00 |
| 12,093,880 B2 * | 9/2024 | Prasad | .................... | G06V 20/59 |
| 2020/0334624 A1 | 10/2020 | Busey | | |
| 2021/0192661 A1 * | 6/2021 | Delgado | ............... | G06T 19/006 |
| 2021/0217161 A1 * | 7/2021 | Smith | ..................... | G06T 7/001 |
| 2022/0348363 A1 * | 11/2022 | Colson | .................... | B33Y 80/00 |
| 2023/0161351 A1 | 5/2023 | Prasad et al. | | |
| 2025/0091751 A1 | 3/2025 | Prsad | | |

OTHER PUBLICATIONS

Office Action for U.S. Appl. No. 18/825,078, mailed on Dec. 19, 2024, Prasad, "System and Methods for Reducing Multi-Container Packing Errors", 22 pages.
Search Report and Written Opinion for International Application No. PCT/US24/45254, Dated Nov. 22, 2024, 11 pages.

* cited by examiner

*Primary Examiner* — Andrew M Tecco
(74) *Attorney, Agent, or Firm* — Lee & Hayes, P.C.

(57) ABSTRACT

A system and devices for automating and computerizing audits, tracking, and error prevention associated with container packing events and, in particular, multi-container packing events at a storage facility, yard, warehouse, or the like. In some cases, the systems and devices may be configured to monitor and detect errors or issues with packing items and send alerts and control signals to agents, such as autonomous agents, to correct the detected errors.

20 Claims, 12 Drawing Sheets

SYSTEM AND METHODS FOR REDUCING MULTI-CONTAINER PACKING ERRORS

CROSS-REFERENCE TO RELATED APPLICATIONS

This application claims priority to U.S. application Ser. No. 18/825,078 filed on Sep. 5, 2024 which is a nonprovisional of and claims priority to U.S. Provisional Application No. 63/583,115 filed on Sep. 15, 2023, the entirety of which is incorporated herein by reference.

BACKGROUND

Storage facilities, such as shipping yards, processing plants, warehouses, distribution centers, ports, yards, and the like, may store vast quantities of inventory over a period of time. Facility operators often generate shipments of various different inventory items. Unfortunately, shipments often contain missing items, wrong items, additional items, and the like, resulting in unnecessary costs associated with lost item claims, returns, and unnecessary restocking.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
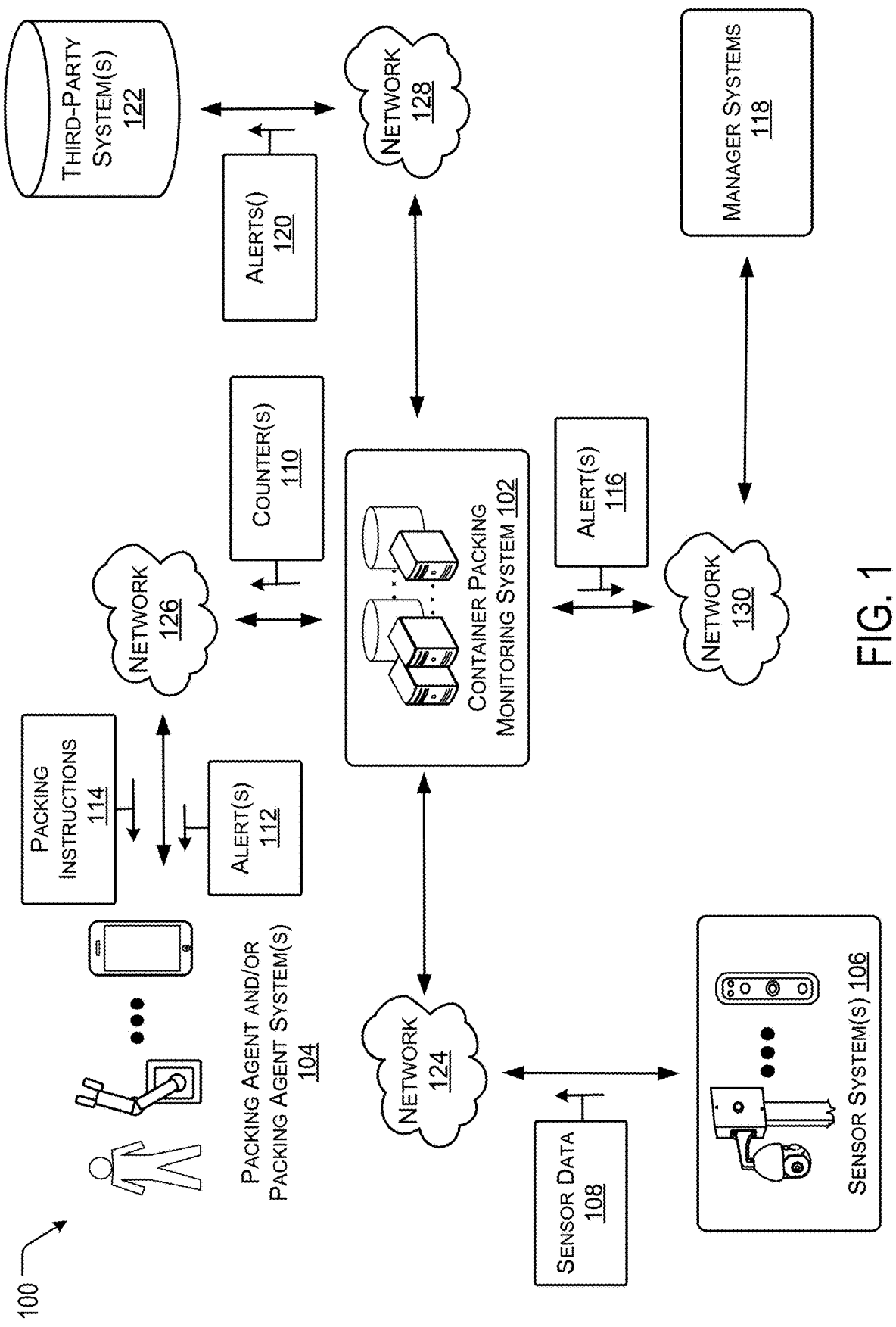
FIG. 1 is an example block diagram of a container packing monitoring system, according to some implementations.

Discussed herein are systems and devices for automating and computerizing audits, tracking, and error prevention associated with container packing events and, in particular, multi-container packing events at a storage facility, yard, warehouse, or the like to improve technologies including but not limited to software as a service, autonomous system controls, robotics, computer vision, and the like. In some facilities, packing agents, employees, operators, robotic systems, autonomous systems, or the like may operate a packing area at which items, assets, and/or merchandise may be delivered for packing into one or more containers prior to shipment. Typically, multiple containers are packed concurrently. Each of the containers may be associated with one or more orders, or the items being packed may be shipped to different faculties, customers, and the like.

In various cases, the orders may also contain various items of differing quantities that may be placed into the same container. In order to fulfill the orders, the packing agent may receive delivery of various items for different orders or containers concurrently, particularly when both orders may include the same class or instances of the same items. Unfortunately, mistakes associated with the binning or packing of items or assets are a common occurrence that substantially increases the cost of distributing goods throughout the world.

The container packing monitoring system, discussed herein, may be configured to capture image data and/or other sensor data of a packing area during a packing event or shift. The container packing monitoring system may process the image data to identify each item delivered to the packing area as well as each item placed in a container for shipping. The container packing monitoring system may also determine if each item is placed in the correct container, a count or quantity of each item placed in each container, if an item is dropped or otherwise misplaced, and the like. For example, in some cases, the packing agent may input a correct item, scan the correct identifier, and/or enter an expected unit number as well as identify the correct container but may place the wrong or incorrect item (such as an adjacent item, asset, bundle of items, or package) in the container. As another example, the agent may scan an identifier of an item but fail to place the item in the cart, such as when the agent is distracted mid-pick.

In some cases, the mistake or error may also not be the packing agents' fault, particularly when an autonomous packing agent (such as a robotic arm or system) is in use. For instance, the item may not be labeled with a correct identifier. In this example, an agent may select the incorrect item based on the correct identifier and the wrong item may be placed in the container. In other examples, an item may include multiple identifiers (such as a reused carton, box, container, or the like), which may also result in mistakes during the packing event.

In some cases, the system may provide the agent with an alert, reminder, control signal, or notification when the container packing monitoring system detects a misplacement, a miscount, or the like associated with one or more items. For instance, the alert may cause a display associated with the packing area to flash (e.g., the display may flash, the incorrect item may flash, such as in red, or a text-based message with additional instructions may appear). In other cases, the alert may be an audible alarm or message output by a speaker associated with the packing area or the like. By providing the alerts and causing corrective actions in substantially real-time the system may, thereby, prevent delays caused by use of an order cart audit or the like. In the case of an autonomous agent, the alert may be in the form of instructions for the autonomous agent to execute, such as to remove the misplaced item from the container.

In some cases, the alert may be sent to electronic equipment (e.g., a display, speaker, or the like) associated with the packing area, to electronic equipment (e.g., a portable electronic device, headset, or the like) associated with an agent, or the like. In some cases, when the system detects that a corrective measure has been taken by the packing agent (e.g., the misplaced item has been moved to the correct container), the system may provide an additional alert or notification to the agent to continue with the pick event (such as updating an icon on a display to be green from the red indicting that the item was misplaced or not placed). The second alert may instruct the packing agent to continue with the next item or set of items. However, if the agent did not take corrective actions (e.g., an incorrect item or incorrect number of items remain in an incorrect container, or the like), the container packing monitoring system may send a third alert or notification to the operator, floor manager, or the like to halt the packing event and correct the error. Additionally, the system may also send alerts to picking agents that are delivering items to the packing area to hold or delay the next delivery as the packing agent may have fallen behind and the introduction of additional items may further delay the container packing process.

In some implementations, the facility (including the packing area) may be equipped with various types of image devices and/or sensors (such as along a surface-wall, ceiling, and the like of the facility), on the packing agent (e.g., a head or body sensor), associated with the containers, associated with vehicles on site (e.g., order carts, forklifts, and the like), or the like. In at least some examples, the sensors may include thermal sensors, time-of-flight sensors, location sensors, LIDAR sensors, SWIR sensors, radar sensors, sonar sensors, infrared sensors, image devices or cameras (e.g., RGB, IR, intensity, depth, etc.), Muon sensors, microphone sensors, environmental sensors (e.g., temperature sensors, humidity sensors, light sensors, pressure sensors, etc.), and the like to generate various types of data including but not limited to image data, lidar data, three-dimensional point cloud data, thermal data, depth data, environmental data, and the like. In some examples, the sensors may include multiple instances of each type of sensor. For instance, camera sensors may include multiple cameras disposed at various locations.

In some cases, the sensor devices may be one or more internet of things (IoT) devices, smart network video recorder (NVR) EDGE, computing devices, or other type of smart or networked sensors. Each IoT or EDGE device may also be equipped with sensors and/or image capture devices usable at night or during the day. In some cases, the IOT or EDGE devices may include processing resources and employ one or more MLM to preprocess the sensor data prior to providing it to a cloud-based system.

The data captured and generated by the sensors may be provided to the container packing monitoring system. The container packing monitoring system may combine or otherwise correlate the sensor data from the various sensors, segment the sensor data, and classify the segmented sensor data to determine objects (such as packed items) from the sensor data. For example, the container packing monitoring system may utilize one or more machine learned models (e.g., machine learning models, machine trained models, and/or the like) and/or networks to segment and classify the sensor data (such as the image data of the packing event). In these examples, the container packing monitoring system may then determine if the correct item and the correct number of items were placed in the correct container during the packing event.

In some examples, the one or more machine learned models or machine learning models (MLM) may include a first MLM to segment the sensor data (image data) that is trained on sensor data and/or image data of items, binning areas, and various systems and individuals performing binning or packing events. The one or more MLM may include a second MLM to classify the segmented sensor data and/or segmented image data of items, binning areas, and various systems and individuals performing binning or packing events. In some specific examples, the one or more MLM may include a third MLM to determine an identity of an agent performing the binning event. The third MLM may be trained on the sensor data and/or image data, segmented sensor data, segmented image data, classified sensor data, and/or classified image data of items, binning areas, and various systems and individuals performing binning or packing events.

In some cases, the packing area may include a display that has a grid representative of the items delivered and each container available for packing. The display may be configured to include, for instance, a grid or representation of the containers and the delivery area. The delivery area may include a grid or representation of each item currently available for packing. The display may display a green background for a container that is currently in a good packing state (e.g., all items packed are associated with an order associated with the container) and a red background for a container that is currently in an error packing state (e.g., at least one item packed is not associated with an order associated with the container). The system may also have a green and red status for each item available to be packed (e.g., green the item is available or packed correctly or red the item has been misplaced, such as dropped or placed in an incorrect bin). In this manner the system may cause the packing agent to stop packing at a time that is substantially concurrent with a packing error. This allows the packing agent to receive feedback and correct the error in substantially real-time.

The display may also display an item identifier adjacent to a count of the item for each container. For example, the display may include item A-10, item B-25, item C-2 over the area of the display associated with the container. In this example, the system may highlight the item on the display for the packing agent when an error occurs. For example, the system may cause the display to present the item identifier or class in a different color together with a number, such as +X or −Y (where X and Y indicate a quantity) to show a number of extra items added to the container or a number of missing items that were not packed. In some cases, the quantity and item identifiers may be determined by comparing a classification of each item placed with an order list associated with the containers.

In some implementations, the container packing monitoring system may also capture sensor data associated with items being delivered, classify the items, and/or determine an identity of each item. In some cases, the container packing monitoring system may determine if an incorrect item has been delivered to the packing area (e.g., the item is not on any order associated with any container in the packing area). In this case, the container packing monitoring system may send an alert and/or cause the display to notify the packing agent that there is an error associated with the item delivery and that there is an extra item in the packaging area. The system may provide details for the agent and/or control signals to an autonomous agent to identify and separate the item for return to the shelves.

Similarly, the container packing monitoring system may determine if an item is missing from a delivery to the packing area (e.g., the item is on an order associated with a container in the packing area but not available to pack). In this case, the container packing monitoring system may send an alert, control signal, and/or cause the display to notify the packing agent that there is an error associated with the delivery and that there is a missing item in the packaging area. The system may also alert other facility operators that the item is missing and should be retrieved and delivered to the packing area. In this case the alert may provide details for the operator or delivery personnel to identify and retrieve the item form the shelves.

In some cases, an item may be delivered with an incorrect label. The container packing monitoring system may, in these cases, determine a class or identity of the item and the presence of an incorrect label. In these cases, the system may send an alert and/or cause the display to notify the packing agent that there is an incorrectly labeled item in the packing area. In some cases, if the item is correct, the system may cause a new label to print and provide instructions to the packing agent to place the label on the item prior to packing. In other cases, if the item is incorrect (e.g., the label is identifying the correct item but the item is incorrect), the system may send an alert, control signal, or the like to other facility operators that the item is mislabeled and that another correct item should be retrieved and delivered to the packing area. In this case the alert may provide details for the operator or delivery personnel to identify and retrieve the misplaced item as well as an additional correct item. The system may also cause a label with the correct identification to print so that the mislabeled item may be re-labeled prior to return to the shelves.

In some situations, if a packing agent ignores or fails to notice the warning, control signal, alerts, or the like and an incorrect item is packed in a container and sent for further processing, the container packing monitoring system may send an alert or control signal to the downstream processing agent (such as a vehicle loading agent, pallet stacking agent, or the like), a facility or floor manager (such as to a personal device associated with the manager), and/or to a third-party system associated with the item and/or the container (such as the seller system, a buyer system, or a transport agent system). In this manner, the alert may be received by one or more parties and the packing error corrected prior to the container leaving the facility.

In some cases, the system may also record or store data associated with a number of packing errors, the identity of item associated with a packing error, an amount of time or delay caused due to the packing error, an identity of the packing agent or delivery agent, as well as other metrics associated with the erroneous packed item. In these cases, the system may determine if multiple agents experienced the same packing error on the same items or similar items and, thereby, generate corrective measures or suggestions, such as changing a label associated with an item type or class.

In some cases, the container packing monitoring system may determine an error has occurred with the packing of an item, bundle or items, asset, or the like using one or more MLM. For example, the container packing monitoring system may input the sensor data (and/or image data) into one or more MLM to segment, classify, and detect errors within the input data. For instance, the one or more MLM may include a first MLM to segment the sensor data (image data) that is trained on sensor data and/or image data of items, binning areas, and various systems and individuals performing binning or packing events including various erroneous picking events, mistakes, or the like. The one or more MLM may include a second MLM to classify the segmented sensor data and/or segmented image data of items, binning areas, and various systems and individuals performing binning or packing events including various erroneous picking events, mistakes, or the like. In some specific examples, the one or more MLM may include a third MLM to determine if an error has occurred. The third MLM may be trained on the sensor data and/or image data, segmented sensor data, segmented image data, classified sensor data, and/or classified image data of items, binning areas, and various systems and individuals performing binning or packing events including various erroneous picking events, mistakes, or the like. In some cases, a fourth MLM may be trained to detect an identity of a packing agent (e.g., individual or autonomous system, such as to detect and diagnose erroneous behavior of an autonomous system). The fourth MLM may be trained on sensor data and/or image data, segmented sensor data, segmented image data, classified sensor data, and/or classified image data of items, binning areas, and various systems and individuals performing binning or packing events including various erroneous picking events, mistakes, or the like.

As discussed herein, the container packing monitoring system may process the sensor data using one or more MLM and/or networks. As described herein, the MLM may be generated using various machine learning techniques. For example, the models may be generated using one or more neural network(s). A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the MLM may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

In some examples, the sensor systems may be one or more IoT devices. The IoT computing devices may include a smart network video recorder (NVR) or other type of EDGE computing device. Each IoT device may also be equipped with sensors and/or image capture devices, such as visible light image systems, infrared image systems, radar based image systems, LIDAR based image systems, SWIR based image systems, Muon based image systems, radio wave based image systems, and/or the like. In some cases, the IoT computing devices may also be equipped with models and instructions to capture, parse, identify, and extract information associated with a collection or delivery event, as discussed above, in lieu of or in addition to the cloud-based services. For example, the IoT computing devices and/or the cloud-based services may be configured to perform segmentation, classification, attribute detection, recognition, data extraction, and the like.

As discussed herein, containers may include boxes, bins, transport handling units (THU), pallets, unit load devices (ULDs), ocean containers, airfreight units, any object that may carry or otherwise transport a product, inventory items, and the like.

FIG. 1 is an example block 100 diagram of a container packing monitoring system 102, according to some implementations. As discussed above, mistakes or errors, such as miss-packing items or misplacing items during a packing event, may result in high-levels of delays and costs (e.g., replacement costs, re-shipping costs, return costs, and the like) associated with product storage, shipping, and sales (e.g., product distribution). The container packing monitoring system 102 may be configured to reduce the number of errors or mistakes made during a packing event by monitoring a packing agent 104 at a packing area as the items are placed into containers, as discussed above. In this manner, the container packing monitoring system 102 may reduce delays and costs associated with product delivery and distribution.

In the current example, sensors systems 106 may be positioned at various locations associated with the packing area, mounted on facility vehicles or containers, worn by the packing agent 104, and the like. The sensors systems 106 may generate sensor data 108 (such as image data) that may be associated with a packing event and/or a packing area or location. The sensor data 108 may be received by the container packing monitoring system 102 during the packing event, such as streamed data from each of the sensor systems 106.

As discussed above, the container packing monitoring system 102 may determine a class, type or other identity of items being delivered to the packing area. The container packing monitoring system 106 may then determine a container or lack thereof as the item is packed by the packing agent 104. In some cases, the container packing monitoring system 102 may also determine an item count 110 for each class or type of item being packed in each individual container (e.g., the system 102 maintains a running count of a quantity for each item in each container in the packing area). For example, if the order included multiple units of an item, the system 102 may determine the identity of each item and increase a counter 110 for a container for each class or type each time an identical item is placed in the same container.

As the items are packed, the container packing monitoring system 102 may also determine if the item is expected (e.g., associated with the order being fulfilled via the corresponding container). If the item is expected, the system 102 may update the counter 110 on a display for the agent 104 and continue to monitor the packing event. However, if the item is unexpected, the system 102 may generate an alert 112 that may be provided to the packing agent 104. For example, if the item is packed in error (e.g., not associated with the container the item was placed in), the system 102 may generate the alert 104 which may be provided to a display, speaker, or the like associated with the packing area, to a headset associated with the agent 104, via an intercom, or other system worn by the agent 104, to an electronic device associated with the agent 104, and/or the like.

In some cases, the container packing monitoring system 102 may utilize one or more MLM to determine if an item is expected or unexpected (e.g., classify the item as expected or unexpected). For example, the MLM may be configured to receive the sensor data 108 as an input and to output a status of the item as expected or unexpected. In some cases, the MLM may also receive a list or order of items that are expected for each bin and/or each shipment. As one example, the MLM may be trained using sensor data, such as image data, of items while binning or packing events are performed by packing agents (both individuals and autonomous systems). In various cases, the training data may include various errors and the like performed during the packing event. The items may also include various states or status of labels (e.g., misplaced, visible, covered, incorrect, duplicates, double labeled, and the like). In some cases, the MLM may be a neural network with multiple connected layers.

In some cases, the alert 112 (or control signal) may include and/or be followed by instructions 114 for remediating the packing error and/or control signals to an autonomous system to perform one or more actions including correcting any detected errors or issues (e.g., re-binning an item, removing an item from a bin, re-labeling an item, and the like). For example, the alert 112 may cause the agent 104 to halt activities associated with the packing event and the instructions 114 may provide steps for remediating the error. In some cases, the instructions 114 may include indications of the item not associated with the order (such as item identifiers, images, and the like), a correct location for the item (e.g., an alternative container) or a return area, and other information usable to assist the agent 104 in correcting the packing issue.

In some examples, alerts 116 may also be provided to a manager system 118 and/or alerts 120 to a third-party system 122. For example, the alerts 116 and 120 to the manager system 118 and/or a third-party system 122 may be the same or differ with each other as well as with the alerts 114 provided to the packing agent 104. For instance, the alerts 116 may be in response to a packing error that was not remedied prior to the container being moved to a downstream processing area and the alerts 120 may be to the third-party system 122 when the packing error was not remediated prior to the container leaving the facility.

In the current example, the data, instructions, and/or alerts may be transmitted to and from the container packing monitoring system 102 using networks 124-130. The networks 124-130 may be any type of network that facilitates communication between one or more systems and may include one or more cellular networks, radio, WiFi networks, short-range or near-field networks, infrared signals, local area networks, wide area networks, the internet, and so forth. In the current example, each network is shown as a separate network but it should be understood that two or more of the networks 124-130 may be combined or the same.

As illustrated, the container packing monitoring system 102 of FIG. 1 may assist in improving existing technologies including but not limited to software as a service, computer vision, autonomous operations and systems, robotics, asset tracking, and the like. For example, early detection of packing errors with respect to autonomous agents improves detection of malfunctioning robotic and autonomous systems through the use of data aggregation, machine learning and artificial intelligence in addition to improving the accuracy and quality of item or asset handling.

FIGS. 2-6 are flow diagrams illustrating example processes associated with the container packing monitoring system discussed herein. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processor(s), perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. In the various examples, each block or groups of blocks may be performed by a trained MLM, as discussed herein. For discussion purposes, the processes herein are described with reference to the frameworks, architectures and environments described in the examples herein, although the processes may be implemented in a wide variety of other frameworks, architectures or environments.

Figure 2:
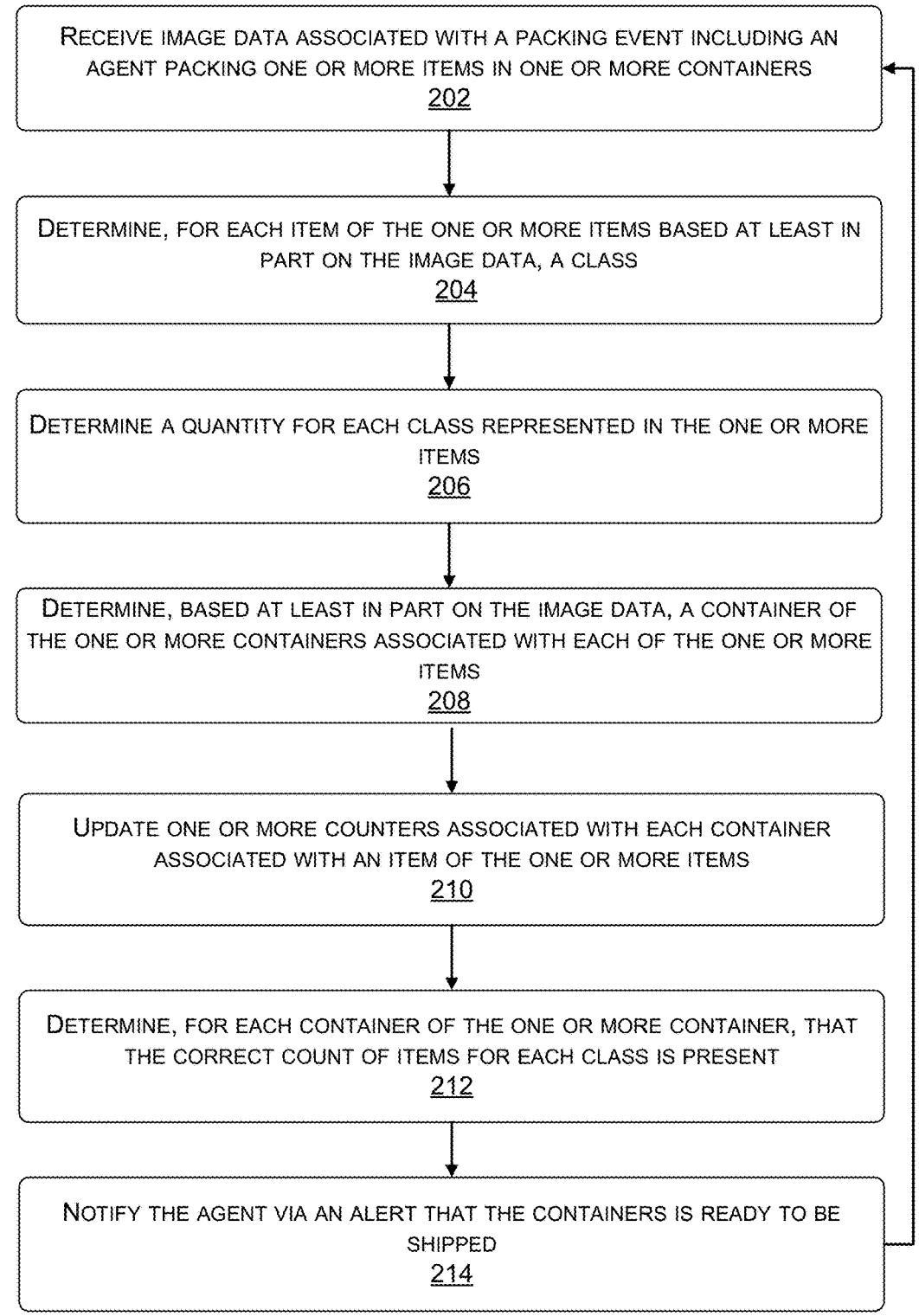
FIG. 2 is a flow diagram illustrating an example process associated with tracking a packing event, according to some implementations.

FIG. 2 is a flow diagram illustrating an example process 200 associated with tracking a packing event, according to some implementations. As discussed above, often errors or mistakes may occur during container packing at a facility resulting in shipping incorrect inventory items to a customer, failing to ship all of the items associated with the order, or shipping items to the wrong customer. These small errors or mistakes can often result in large costs to the company as items must be restocked and reshipped to meet, for instance, contractual obligations.

At 202, a container packing monitoring system may receive image data (and/or other sensor data) associated with a packing event including an agent packing one or more items in one or more containers. As discussed above, the container packing monitoring system may receive the image data from cameras and/or other sensors positioned about a packing area assigned to the packing agent. In some cases, at least a portion of the sensors may be EDGE computing devices configured to provide initial processing on the sensor data prior to sending to the cloud-based container packing monitoring system.

At 204, the container packing monitoring system may determine, for each item of the one or more items based at least in part on the image data, a class or item type. For example, a delivery agent may deliver inventory items associated with one or more orders to the packing area. The delivery may include multiple instances of the same item, such as when shipping the container to a retail location or other location that orders in bulk. Alternatively, the delivery may contain many different items, such as when the order is going to an individual that has ordered a wide variety of supplies.

In some cases, the container packing monitoring system may utilize one or more MLM to segment the image data into features, such as individual items. The container packing monitoring system may also utilize one or more additional MLM to classify each of the features (e.g., to assign a class or identifier to each of the items). In some cases, the container packing monitoring system may also determine an identifier or any other information associated with the item (such as a label, logo, shape, size, or the like) to determine the class or type of the item. In some cases, the MLM may be trained using human or automated input based on image data and/or sensor data captured from multiple facilities packing areas. In some cases, the training data may include the items stored in the facility. In some instances, the training data may be supplemented with synthetic or computer generated training data.

At 206, the container packing monitoring system may determine a quantity for each class represented in the one or more items. For example, the system may determine a quantity of each class or type of item that has two or more instances within the packing area. For instance, the system may determine that there are 27 items As, 45 items Bs, and 10 item Cs. In some cases, the system may determine that the total quantity for each item class corresponds to the total for all orders current being filled by the packing agent. The system may also utilize one or more MLM to determine the quantity of each item. In some cases, the inputs may include the classified features of the image data. Again, the one or more MLM may be trained using image data or synthetic image data captured from multiple facilities and/or multiple packing areas.

At 208, the container packing monitoring system may determine, based at least in part on the image data, a container of the one or more containers associated with each of the one or more items. For example, various containers may be placed or arrive within the packing area and may be associated with one or more orders being filled by the packing agent. Each container that enters the packing area may be identified and assigned an order by the container packing monitoring system, such that the system may determine that each item is placed in the correct, desired, or corresponding container. In some cases, the system may also partition the image data to determine a region associated with each of the containers (e.g., such that items placed within the region are assigned to the corresponding container). In some instances, the containers may not be assigned prior to packing (e.g., the containers are identical unlabeled boxes or the like). The system may then assign a container to an order and cause the assignment to be displayed to the packing agent via the displays within the packing area, a personal electronic device assigned to the agent, or the like.

In some cases, the container packing monitoring system may utilize one or more MLM to segment, classify, and assign regions to the containers, as discussed above with respect to the items. Accordingly, the system may input the image data into the one or more MLM and receive the identification, assignment, and/or region as an output. Again, the MLM may be trained using human or automated input based on image data captured from multiple facilities packing areas. In some cases, the training data may include the items stored in the facility. In some instances, the training data may be supplemented with synthetic or computer generated training data.

At 210, the container packing monitoring system may update one or more counters associated with each container associated with an item of the one or more items. For example, as the system detects a placement of an item of a particular or first class within a particular or first container, the system may update the count of the first item within the first container for the packing agent. The count or quantity packed may then be presented to the agent via the display assigned to the packing area, an electronic device assigned to the packing agent, or the like. In this manner, the system may continuously process a stream of image data from one or more sensors associated with the packing area to track the movement or packing of each item, the arrival of items, and the like within the packing area.

At 212, the container packing monitoring system may determine, for each container of the one or more containers, that the correct count of items for each class is present (e.g., each item for each class that is expected for the container has been packed and no additional items have been packed). For example, the system may utilize or compare an order or portion of an order associated with the specific container together with the quantity count for each item within the container to determine if the container is full or ready. In this manner, the system may be able to assist the packing agent in determining when a container is fully packed and ready to ship.

In some cases, when an autonomous system or robotic agent is in use, the container packing monitoring system may determine if a number of errors or miscounts of items for each class occurs, the container packing monitoring system may be configured to determine that the autonomous system or robotic agent is malfunctioning. In some cases, the container packing monitoring system may utilize one or more MLM to determine or diagnosis issues, bugs, or other malfunctions of the autonomous agent based at least in part on the type (or class) of errors, number of errors, and the like. In some cases, the diagnostic MLM may be trained using image data and sensor data of autonomous agents of various types (e.g., arms, conveyors, packers, forklifts, other vehicles, or the like) performing packing events including performing erroneous actions.

At 214, the container packing monitoring system may notify the agent via an alert that the container may be shipped or is ready to ship. Once the system determines the container is ready, the system may cause an alert to be presented on the display associated with the packing area (such as the container flashing, changing colors, or other visual indication), to be received by a personal electronic device assigned or associated with the packing agent, to be output via a loudspeaker or headset system worn by the agent, or the like. In some cases, the system may also cause a label with, for instance, shipping instructions to print with regards to the container once the system determines the container is fully packed. In some cases, the alert may be a control signal and the agent may be an autonomous system, such as an autonomous vehicle that is configured to deliver the shipment to a destination.

Figure 3:
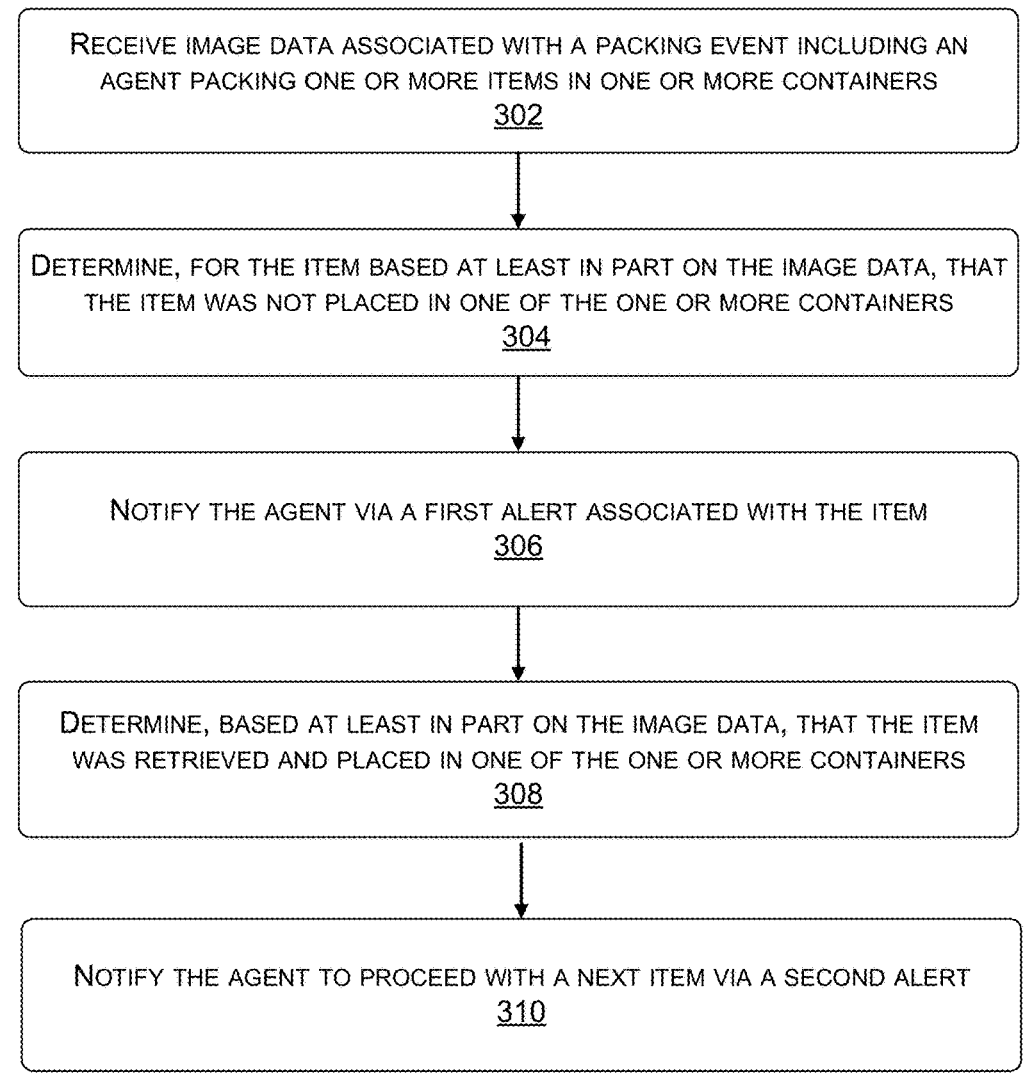
FIG. 3 is a flow diagram illustrating an example process associated with determining an item is misplaced during a packing event, according to some implementations.

FIG. 3 is a flow diagram illustrating an example process 300 associated with determining an item is misplaced during a packing event, according to some implementations. As discussed above, often errors or mistakes may occur during container packing at a facility, such as misplacing an item resulting in shipping failing to ship all of the items associated with the order. These small errors or mistakes can often result in large costs to the company as items must be restocked and reshipped to meet, for instance, contractual obligations.

At 302, a container packing monitoring system may receive image data (and/or other sensor data) associated with a packing event including an agent (either human or autonomous) packing one or more items in one or more containers. As discussed above, the container packing monitoring system may receive the image data from cameras and/or other sensors positioned about a packing area assigned to the packing agent.

At 304, the container packing monitoring system may determine, for the item, based at least in part on the image data, that the item was not placed in one of the one or more containers. For example, the system may track the item as the item is moved by the packing agent. The system may then determine (such as via one or more trained MLM) a location or region associated with a placement of the item. For example, if the placement was outside a container (e.g., the region of the placement was not assigned to any container), the system may determine that the item was not placed in one of the one or more containers. As one example, the system may substantially in real-time assign pixels to each of the containers as a corresponding region (such as via another one or more trained MLM). As the containers are moved the system may then update the pixel mapping to regions. In this example, if the item is determined to be placed at an area associated with pixels not assigned to a container region then the system may determine the item was not placed in a container.

At 306, the container packing monitoring system may notify the agent via a first alert associated with the item. For example, the system may cause an alert to be presented on the display associated with the packing area (such as the container flashing, an item icon flashing, changing colors, or other visual indication that the item has been misplaced). The system may also send alerts to a personal electronic device assigned or associated with the packing agent or output an audio alert via a loudspeaker or headset system worn by the agent or the like. In some cases, the system may send an alert control signal to an autonomous agent to cause the autonomous agent to halt operations and/or re-pack the item.

At 308, the container packing monitoring system may determine, based at least in part on the image data, that the item was retrieved and placed in one of the one or more containers. For example, the system may receive additional image data which may be utilized to determine that the item was retrieved and moved to another region, such as a region associated with a container.

At 310, the container packing monitoring system may notify the agent to proceed with a next item via a second alert. In some examples, the system may cause an alert to be presented on the display associated with the packing area, to be received by a personal electronic device assigned or associated with the packing agent, to be output via a loudspeaker or headset system worn by the agent, or the like.

Figure 4:
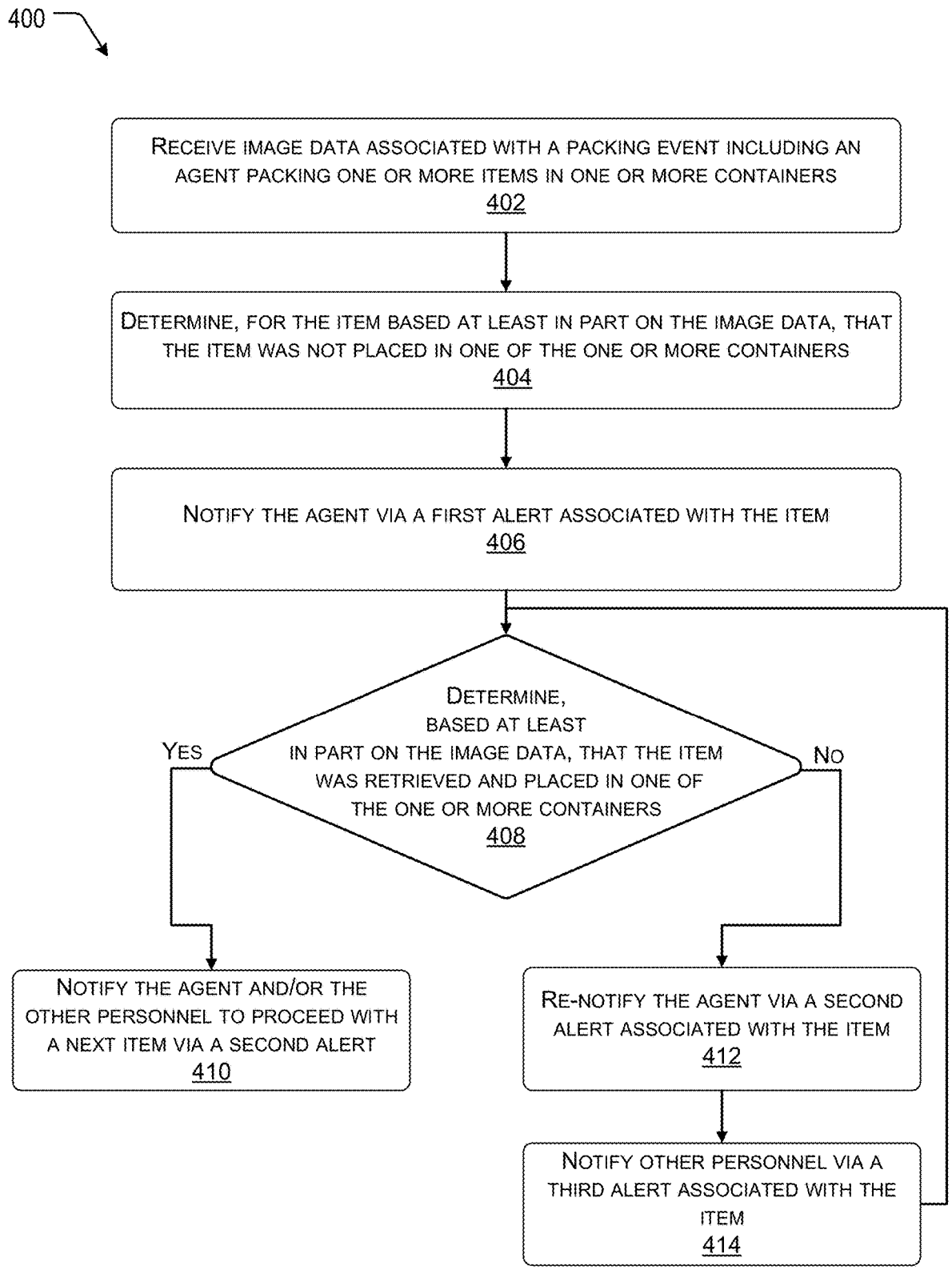
FIG. 4 is a flow diagram illustrating an example process associated with determining an item is misplaced during a packing event, according to some implementations.

FIG. 4 is a flow diagram illustrating an example process 400 associated with determining an item is misplaced during a packing event, according to some implementations. As discussed above, often errors or mistakes may occur during container packing at a facility resulting in shipping incorrect inventory items to a customer or shipping items to the wrong customer. These small errors or mistakes can often result in large costs to the company as items must be restocked and reshipped to meet, for instance, contractual obligations.

At 402, a container packing monitoring system may receive image data (and/or other sensor data) associated with a packing event including an agent packing one or more items in one or more containers. As discussed above, the container packing monitoring system may receive the image data from cameras and/or other sensors positioned about a packing area assigned to the packing agent.

At 404, the container packing monitoring system may determine, for the item based at least in part on the image data, that the item was not placed in one of the one or more containers. For example, the system may track the item as the item is moved by the packing agent. The system may then determine (such as via one or more MLM trained on image data of various items, packaging, assets and the like) a location or region associated with a placement of the item. For example, if the placement was outside a container (e.g., the region of the placement was not assigned to any container), the system may determine that the item was not placed in one of the one or more containers (such as via another one or more MLM trained on image data of packing events). As one example, the system may substantially in real-time assign pixels to each of the containers as a corresponding region. As the containers are moved the system may then update the pixel mapping to regions. In this example, if the item is determined to be placed at an area associated with pixels not assigned to a container region then the system may determine the item was not placed in a container.

At 406, the container packing monitoring system may notify the agent via a first alert associated with the item. For example, the system may cause an alert to be presented on the display associated with the packing area (such as the container flashing, an item icon flashing, changing colors, or other visual indication that the item has been misplaced). The system may also send alerts to a personal electronic device assigned or associated with the packing agent or output an audio alert via a loudspeaker or headset system worn by the agent or the like. In some cases, the system may send an alert control signal to an autonomous agent to cause the autonomous agent to halt operations and/or re-pack the item.

At 408, the container packing monitoring system may determine, based at least in part on the image data, that the item was retrieved and placed in one of the one or more containers. Again, the system may track the item as the item is retrieved and moved by the packing agent. The system may determine a second location or second region associated with a placement of the item. During the second placement, if the placement was in a container (e.g., the region of the placement was not assigned to any container), the system may determine that the item was placed in a container. The system may then determine based on a container identifier if the container was desired or correct.

If the container was correct, the process 400 may advance to 410 and, at 410, notify the agent and/or other personnel to proceed with a next item via a second alert. In some examples, the system may cause an alert to be presented on the display associated with the packing area, to be received by a personal electronic device assigned or associated with the packing agent, to be output via a loudspeaker or headset system worn by the agent, or the like.

However, if the item was still misplaced, the process 400 may advance to 412. At 412, the container packing monitoring system may re-notify the agent via a second alert associated with the item. For example, the system may cause a second alert to be presented on the display associated with the packing area (such as the container flashing, an item icon flashing, changing colors, or other visual indication that the item has been misplaced). The system may also send the second alert to a personal electronic device assigned or associated with the packing agent or output an audio alert via a loudspeaker or headset system worn by the agent or the like. In some cases, the system may send a second control signal to an autonomous agent to cause the autonomous agent to halt operations and/or re-pack the item.

At 414, the container packing monitoring system may also notify other personnel via a third alert (or control signal) associated with the item. For example, the system may send alerts to downstream operators or agents (such as door dock agents, shipping agents, or the like). The system may also notify facility or floor managers that a misplaced item is in the packing area. The system may also in some cases send alerts to the customer or other third-party systems.

Figure 5:
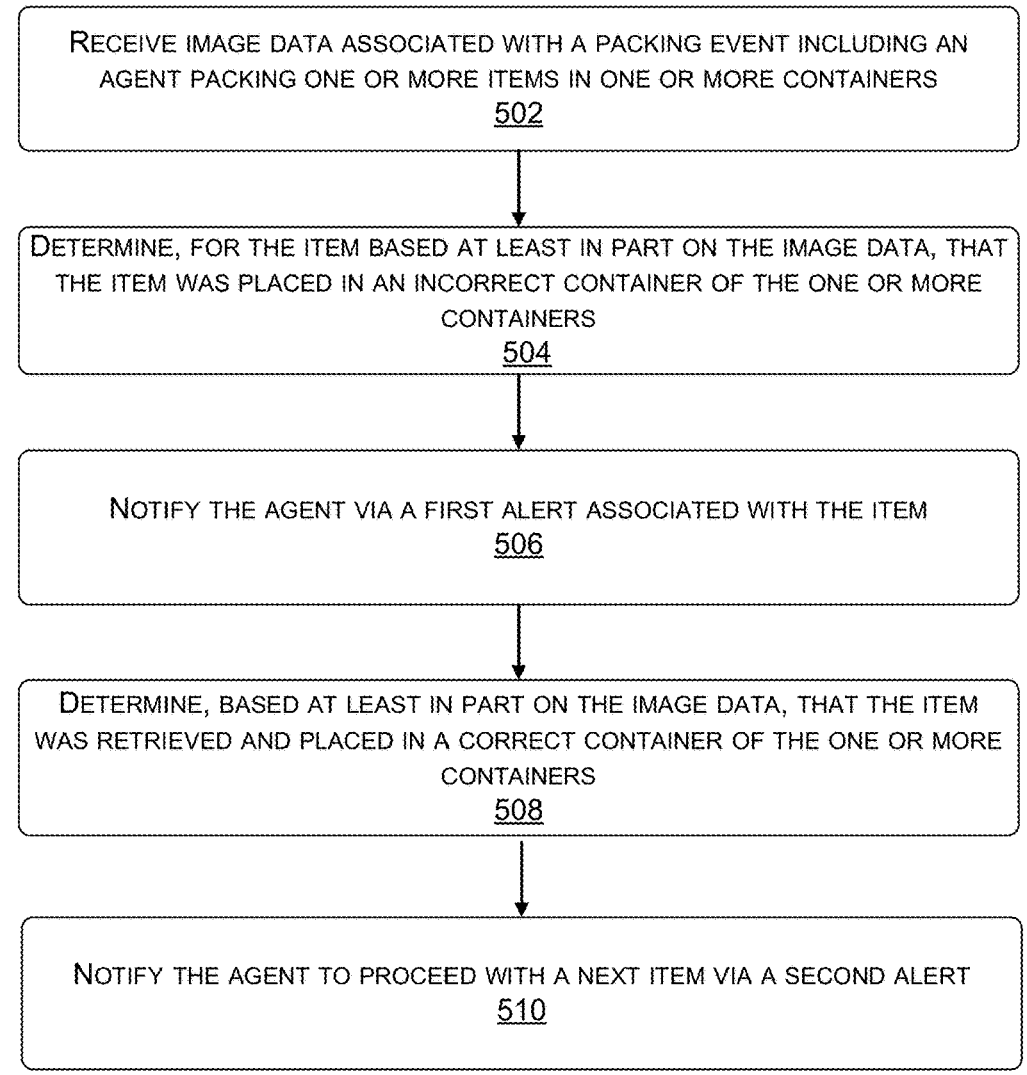
FIG. 5 is a flow diagram illustrating an example process associated with determining an item is packed in an incorrect container during a packing event, according to some implementations.

FIG. 5 is a flow diagram illustrating an example process 500 associated with determining an item is packed in an incorrect container during a packing event, according to some implementations. As discussed above, often errors or mistakes may occur during container packing at a facility resulting in shipping incorrect inventory items to a customer or shipping items to the wrong customer. These small errors or mistakes can often result in large costs to the company as items must be restocked and reshipped to meet, for instance, contractual obligations.

At 502, a container packing monitoring system may receive image data (and/or other sensor data) associated with a packing event including an agent packing one or more items in one or more containers. As discussed above, the container packing monitoring system may receive the image data from cameras and/or other sensors positioned about a packing area assigned to the packing agent.

At 504, the container packing monitoring system may determine, for the item based at least in part on the image data, that the item was placed in an incorrect container of the one or more containers. For example, the system may track the item as the item is moved by the packing agent. The system may then determine (such as via one or more MLM trained on pixel mappings of segmented and classified items within image data of a packing event) a location or region associated with a placement of the item. For example, if the placement was in a first container (e.g., the region of the placement was assigned to a first container) and the item was designated for the second container, the system may determine that the item was placed in an incorrect container. As one example, the system may substantially in real-time assign pixels to each of the containers as a corresponding region. As the containers are moved the system may then update the pixel mapping to regions. In this example, if the item is determined to be placed at an area associated with pixels assigned to a container's region then the system may determine the item was placed in the container. The system may then determine based on a container identifier if the container was desired or correct.

At 506, the container packing monitoring system may notify the agent via a first alert (including a control signal to an autonomous agent) associated with the item. For example, the system may cause an alert to be presented on the display associated with the packing area (such as the container flashing, an item icon flashing, changing colors, or other visual indication that the item has been misplaced). The system may also send alerts to a personal electronic device assigned or associated with the packing agent or output an audio alert via a loudspeaker or headset system worn by the agent or the like. In some cases, the system may send an alert control signal to an autonomous agent to cause the autonomous agent to halt operations and/or re-pack the item.

At 508, the container packing monitoring system may determine, based at least in part on the image data, that the item was retrieved and placed in one of the one or more containers. A gain, the system may track the item (such as via the one or more MLM) as the item is retrieved and moved by the packing agent. The system may determine a second location or second region associated with a placement of the item. During the second placement, if the placement was in a container (e.g., the region of the placement was not assigned to any container), the system may determine that the item was placed in a container. The system may then determine based on a container identifier if the container was desired or correct.

At 510, the container packing monitoring system may notify the agent and/or other personnel to proceed with a next item via a second alert. In some examples, the system may cause an alert to be presented on the display associated with the packing area, to be received by a personal electronic device assigned or associated with the packing agent, to be output via a loudspeaker or headset system worn by the agent, or the like. In some cases, the alert may include a control signal to an autonomous agent to cause the autonomous agent to continue with the next item.

Figure 6:
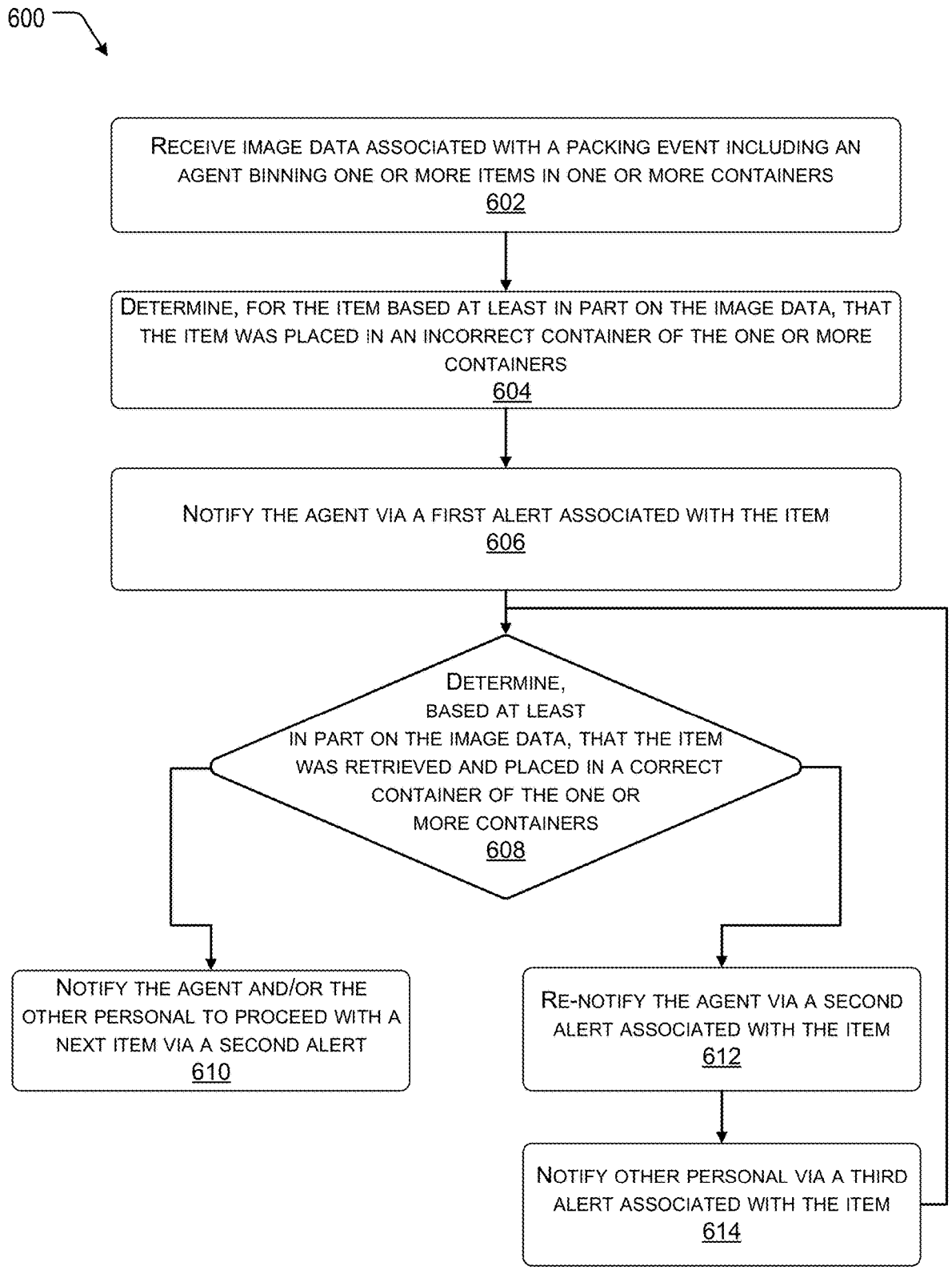
FIG. 6 is a flow diagram illustrating an example process associated with determining an item is packed in an incorrect container during a packing event, according to some implementations.

FIG. 6 is a flow diagram illustrating an example process associated with determining an item is packed in an incorrect container during a packing event, according to some implementations. As discussed above, often errors or mistakes may occur during container packing at a facility resulting in shipping incorrect inventory items to a customer or shipping items to the wrong customer. These small errors or mistakes can often result in large costs to the company as items must be restocked and reshipped to meet, for instance, contractual obligations.

At 602, a container packing monitoring system may receive image data (and/or other sensor data) associated with a packing event including an agent packing one or more items in one or more containers. As discussed above, the container packing monitoring system may receive the image data from cameras and/or other sensors positioned about a packing area assigned to the packing agent.

At 604, the container packing monitoring system may determine, for the item, based at least in part on the image data, that the item was placed in an incorrect container of the one or more containers. For example, the system may track the item as the item is moved by the packing agent. The system may then determine (such as via one or more MLM trained using pixel mapping of image data of items (segmented and/or classified) and packing events) a location or region associated with a placement of the item. For example, if the placement was in a first container (e.g., the region of the placement was assigned to a first container) and the item was designated for the second container, the system may determine that the item was placed in an incorrect container. As one example, the system may substantially in real-time assign pixels to each of the containers as a corresponding region. As the containers are moved the system may then update the pixel mapping to regions. In this example, if the item is determined to be placed at an area associated with pixels assigned to a container's region then the system may determine the item was placed in the container. The system may then determine based on a container identifier if the container was desired or correct.

At 606, the container packing monitoring system may notify the agent via a first alert associated with the item. For example, the system may cause an alert to be presented on the display associated with the packing area (such as the container flashing, an item icon flashing, changing colors, or other visual indication that the item has been misplaced). The system may also send alerts to a personal electronic device assigned or associated with the packing agent or output an audio alert via a loudspeaker or headset system worn by the agent or the like. In some cases, the alert may include a control signal to an autonomous agent to cause the autonomous agent to halt operations and/or re-pack the item.

At 608, the container packing monitoring system may determine, based at least in part on the image data, that the item was retrieved and placed in a correct container of the one or more containers. A gain, the system may track the item (such as via a MLM) as the item is retrieved and moved by the packing agent. The system may determine a second location or second region associated with a placement of the item. During the second placement, if the placement was in a second container (e.g., the region of the placement was not assigned to the second container), the system may determine that the item was placed in the second container. The system may then determine based on container identifiers if the second container was desired or correct.

If the container was correct, the process 600 may advance to 610 and, at 610, notify the agent and/or other personnel to proceed with a next item via a second alert. In some examples, the system may cause an alert to be presented on the display associated with the packing area, to be received by a personal electronic device assigned or associated with the packing agent, to be output via a loudspeaker or headset system worn by the agent, or the like. In some cases, the alert to proceed may include a control signal to an autonomous agent to cause the autonomous agent to halt operations and/or re-pack the item.

However, if the item was still misplaced, the process 600 may advance to 612. At 612, the container packing monitoring system may re-notify the agent via a second alert associated with the item. For example, the system may cause a second alert to be presented on the display associated with the packing area (such as the container flashing, an item icon flashing, changing colors, or other visual indication that the item has been misplaced). The system may also send the second alert to a personal electronic device assigned or associated with the packing agent or output an audio alert via a loudspeaker or headset system worn by the agent or the like. In some cases, the second alert may include a control signal to an autonomous agent to cause the autonomous agent to halt operations and/or re-pack the item.

At 614, the container packing monitoring system may also notify other personnel via a third alert associated with the item. For example, the system may send alerts and/or control signals to downstream operators or agents (such as door dock agents, shipping agents, or the like). The system may also notify facility or floor managers that a misplaced item is in the packing area. The system may also in some cases send alerts to the customer or other third-party systems.

Figure 7:
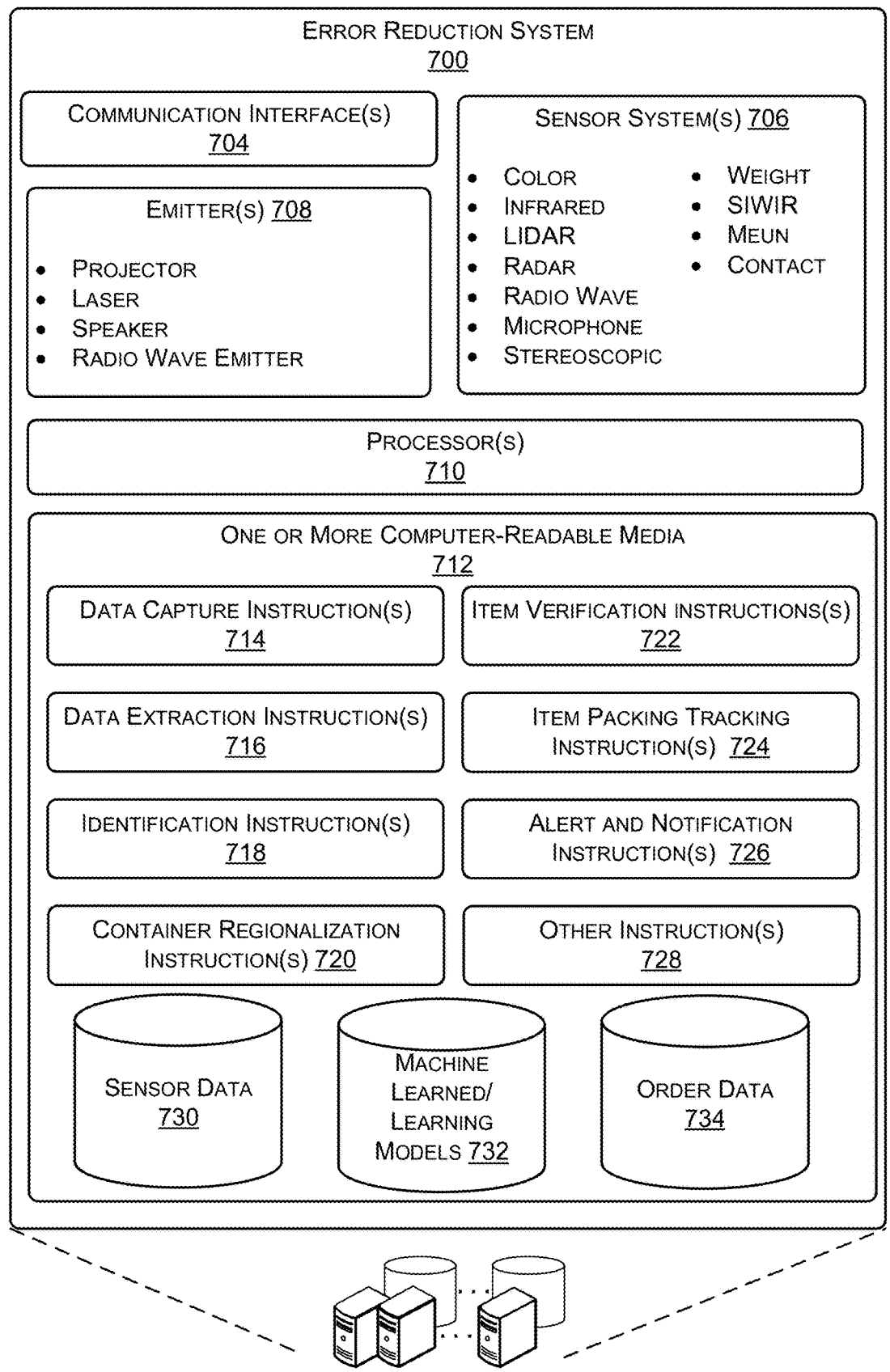
FIG. 7 is an example container packing monitoring system that may implement the techniques described herein according to some implementations.

FIG. 7 is an example container packing monitoring system that may implement the techniques described herein according to some implementations. The system 700 may include one or more communication interface(s) 704 (also referred to as communication devices and/or modems), one or more sensor system(s) 706, and one or more emitter(s) 708.

The system 700 can include one or more communication interfaces(s) 704 that enable communication between the system 700 and one or more other local or remote computing device(s) or remote services, such as a cloud-based service of FIG. 1. For instance, the communication interface(s) 704 can facilitate communication with other proximate sensor systems and/or other facility systems. The communications interfaces(s) 704 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

The one or more sensor system(s) 706 may be configured to capture the sensor data 730 associated with an order cart. In at least some examples, the sensor system(s) 706 may include thermal sensors, time-of-flight sensors, location sensors, LIDAR sensors, SIWIR sensors, radar sensors, sonar sensors, infrared sensors, cameras (e.g., RGB, IR, intensity, depth, etc.), Muon sensors, microphone sensors, environmental sensors (e.g., temperature sensors, humidity sensors, light sensors, pressure sensors, etc.), and the like. In some examples, the sensor system(s) 706 may include multiple instances of each type of sensors. For instance, camera sensors may include multiple cameras disposed at various locations.

The system 700 may also include one or more emitter(s) 708 for emitting light and/or sound. By way of example and not limitation, the emitters in this example include light, illuminators, lasers, patterns, such as an array of light, audio emitters, and the like.

The system 700 may include one or more processors 710 and one or more computer-readable media 712. Each of the processors 710 may itself comprise one or more processors or processing cores. The computer-readable media 712 is illustrated as including memory/storage. The computer-readable media 712 may include volatile media (such as random access memory (RAM)) and/or nonvolatile media (such as read only memory (ROM), Flash memory, optical disks, magnetic disks, and so forth). The computer-readable media 712 may include fixed media (e.g., RAM, ROM, a fixed hard drive, and so on) as well as removable media (e.g., Flash memory, a removable hard drive, an optical disc, and so forth). The computer-readable media 712 may be configured in a variety of other ways as further described below.

Several modules such as instructions, data stores, and so forth may be stored within the computer-readable media 712 and configured to execute on the processors 710. For example, as illustrated, the computer-readable media 712 stores data capture instructions 714, data extraction instructions 716, identification instructions 718, container regionalization instructions 720, item verification instructions 722, item packing tracking instruction 724, alert and notification instructions 726, as well as other instructions 728, such as an operating system. The computer-readable media 712 may also be configured to store data, such as sensor data 730, MLM 732, and order data 734, as well as other data.

The data capture instructions 714 may be configured to extract image data or other sensor data representing an item or container. For instance, when an item or container is detected entering, traversing, or being positioned within a packing area, the data capture instructions 714 may cause the sensor system 706 to control (e.g., adjust parameters, zoom, tilt, pan, or otherwise adjust) the sensors to capture the sensor data 720 associated with the detected item or container. In some cases, the parameters may be based on the dimensions, size, identity, number of items, current stacking arrangement, or the like.

The data extraction instructions 716 may be configured to determine features associated each item on the order cart based at least in part on the sensor data 730 captured according to the data capture instructions 714. For example, the extraction instructions 716 may determine a size, dimensions, orientation, or the like associated with each item.

The identification instructions 718 may be configured to determine an identity of each item on the order cart based at least in part on the sensor data 730 and the features identified by the data extraction instructions 716. For example, the identification instructions 718 may determine an identity of an item based at least in part on the size, the dimensions, a detected bar code or other identifier, relative position (e.g., stack on top), implied pick order (e.g., top items are picked later than bottom items) or the like. The identification instructions 718 may also utilize a list of known items or the order list to determine the identity of each item.

The container regionalization instructions 720 may be configured to substantially in real-time segment a packing area into various regions (such as based on pixel counting) into one or more regions associated with individual containers, such that each container is associated with a region.

The item verification instructions 722 may be configured to determine if a label or identity of an item is correct and represents the actual item. For example, the system may determine the identity of the item based on the features of the item extracted from the image data and then compare the determined identity to the identity associated with the identifier or label.

The item packing tracking instructions 724 may be configured to determine if an item is placed within a correct or desired region. For example, the system may track the movement of the item from a receiving area to a container or an area outside all of the containers. The system may then determine if the container or region that the item was moved or placed in is desired or otherwise correct.

The alert and notification instruction 726 may be configured to generate an alert or notification if one or more items are not identified, missing, or additional items need to be added. Similarly, the alert instruction 726 may be configured to generate an alert if one or more items appear to be damaged. In some cases, the alerts may be a message to a device associated with one or more operators.

Figure 8:
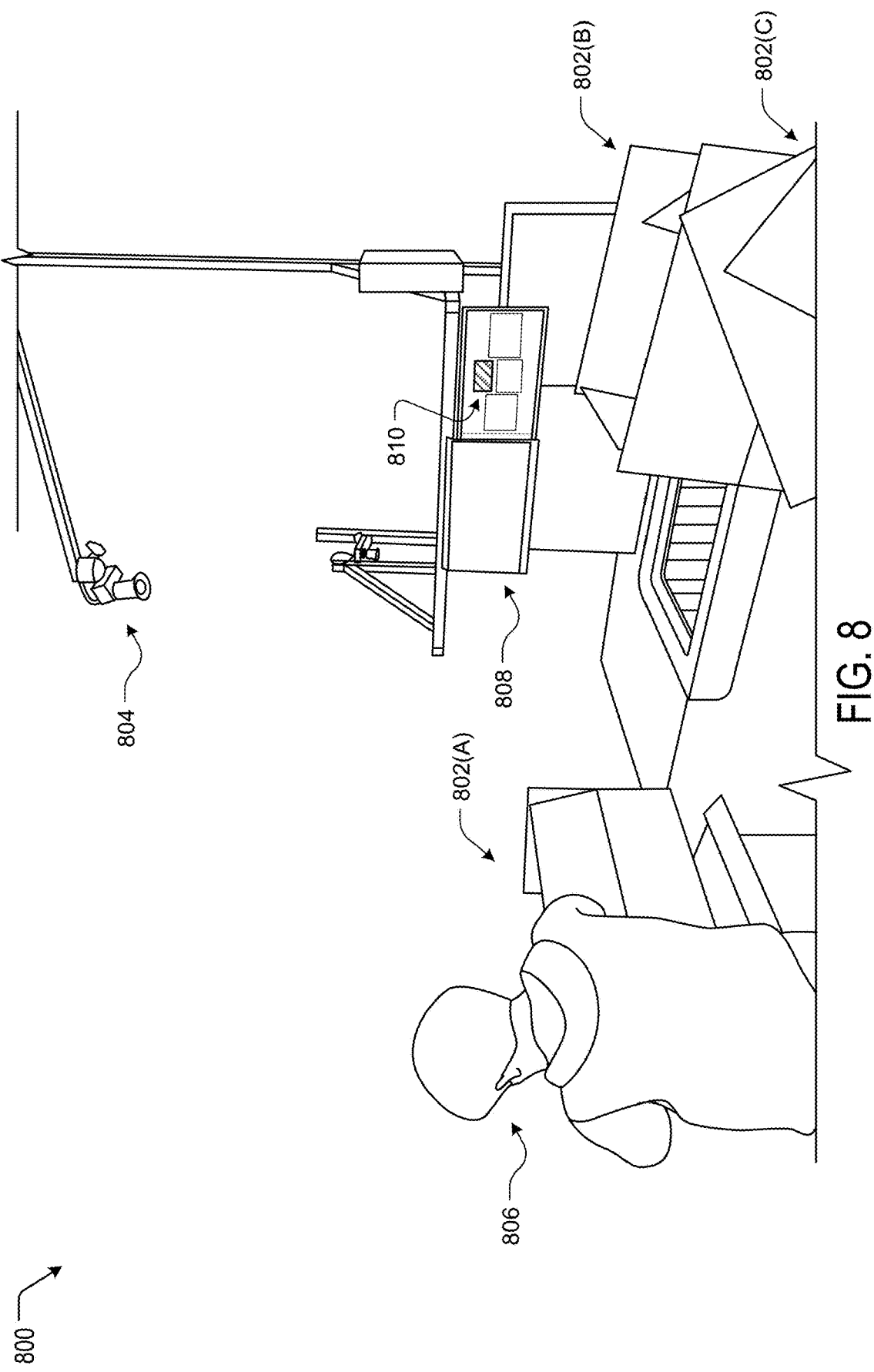
FIG. 8 is an example pictorial diagram illustrating a packing area including multiple containers according to some implementations.

FIG. 8 is an example pictorial diagram illustrating a packing area 800 including multiple containers 802 according to some implementations. As discussed above, a container packing monitoring system may receive image data from one or more sensors and/or image devices 804 position with respect to the packing area 800. The system may be configured to provide alerts to the packing agent 806 via displays 808. In the current example, the system may be presenting an alert 810 by causing a change in a visual feature on the displays 808 associated with a particular container.

Figure 9:
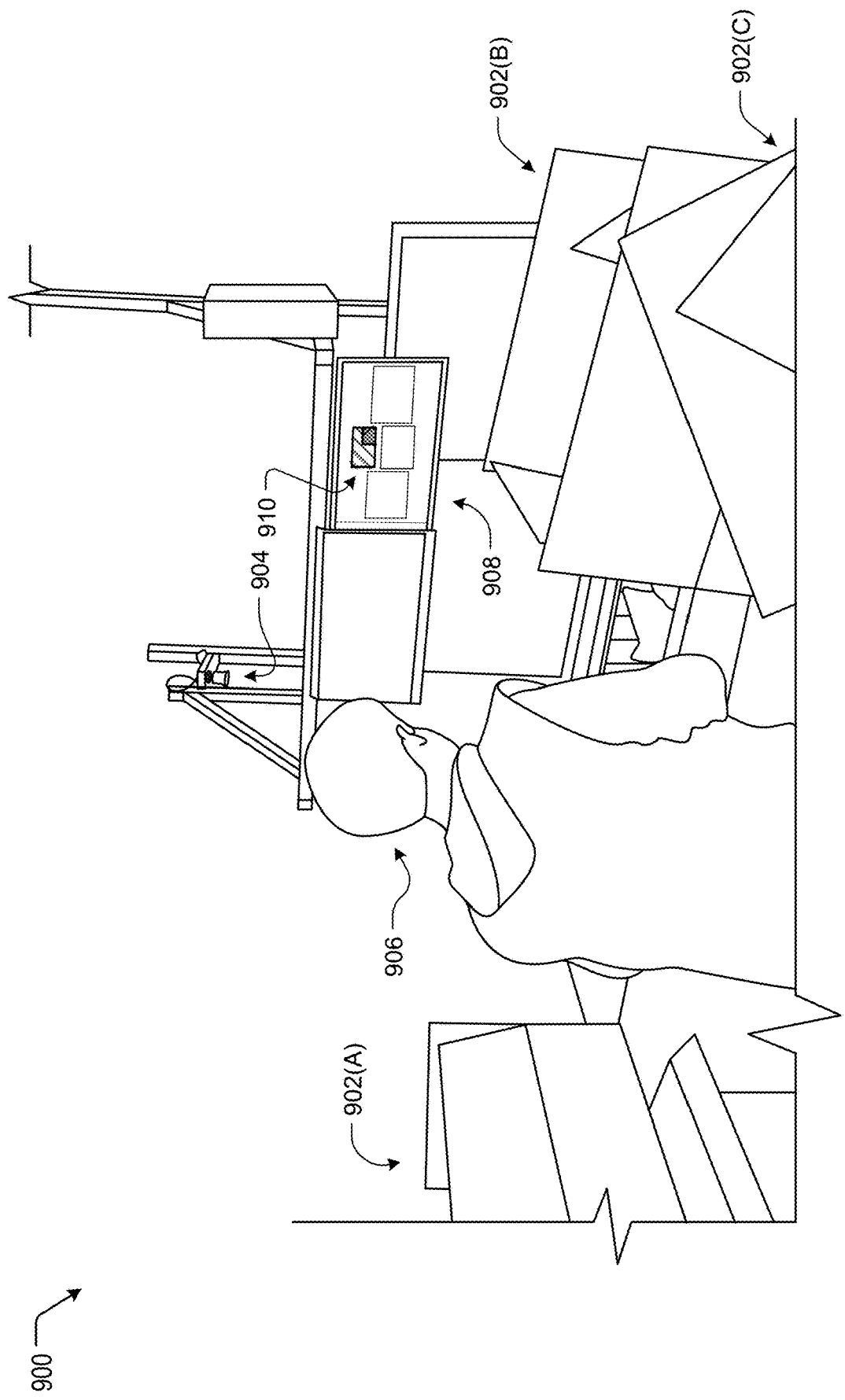
FIG. 9 is another example pictorial diagram illustrating a packing area including multiple containers according to some implementations.

FIG. 9 is another example pictorial diagram illustrating a packing area 900 including multiple containers 902 according to some implementations. As discussed above, a container packing monitoring system may receive image data from one or more sensors and/or image devices 904 position with respect to the packing area 900. The system may be configured to provide alerts to the packing agent 906 via displays 908. In the current example, the system may be presenting an alert 910 by causing a change in a visual feature on the displays 908 associated with a particular container.

Figure 10:
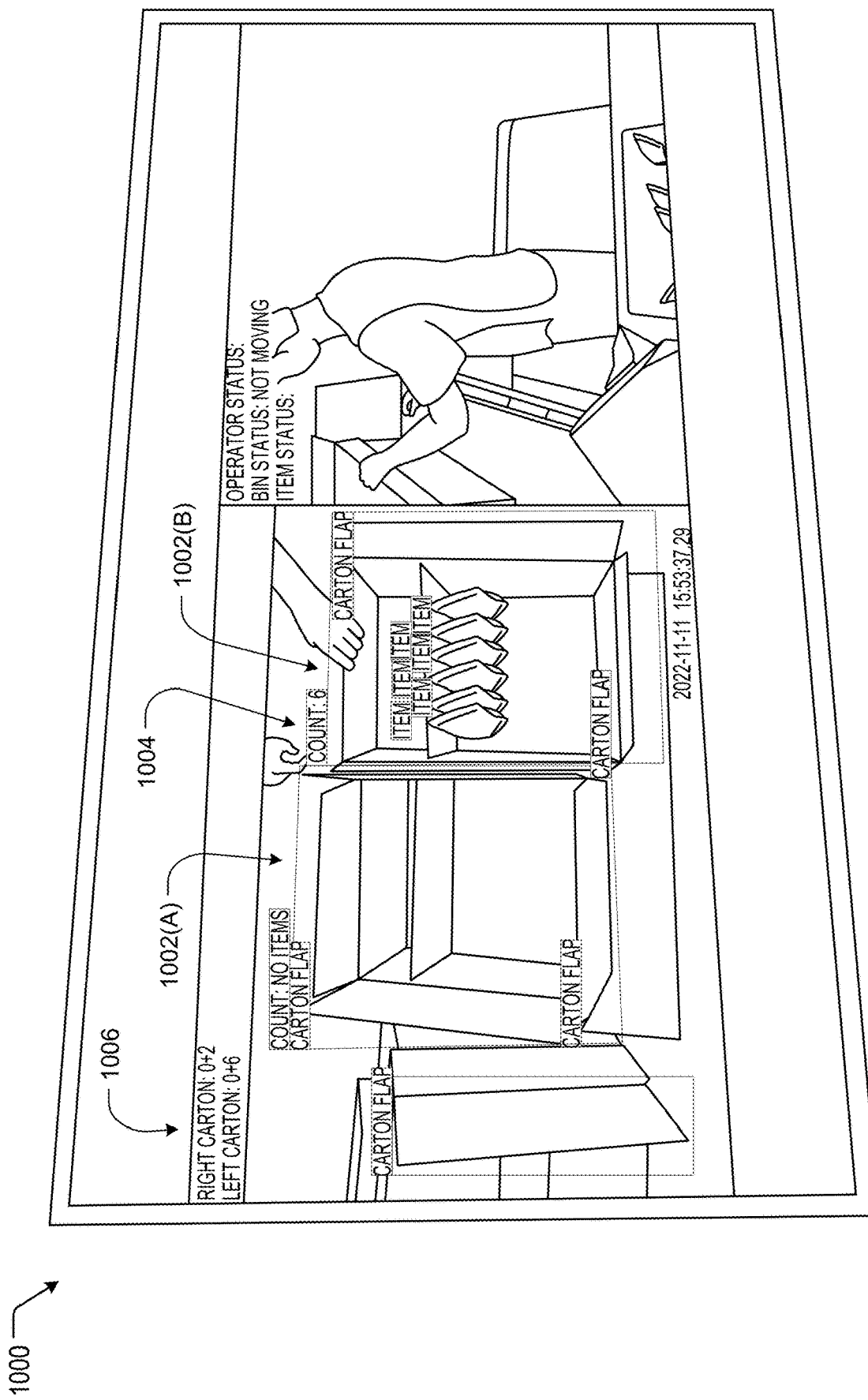
FIG. 10 is another example pictorial diagram illustrating a display associated with a packing area including multiple containers according to some implementations.

FIG. 10 is another example pictorial diagram illustrating a display 1000 associated with a packing area including multiple containers according to some implementations. In the current example, the system may display regions 1002 associated with each container. The display 1000 may also present a count 1004 of each item placed in the container and a running quantity or count 1006 of each carton or container as illustrated.

Figure 11:
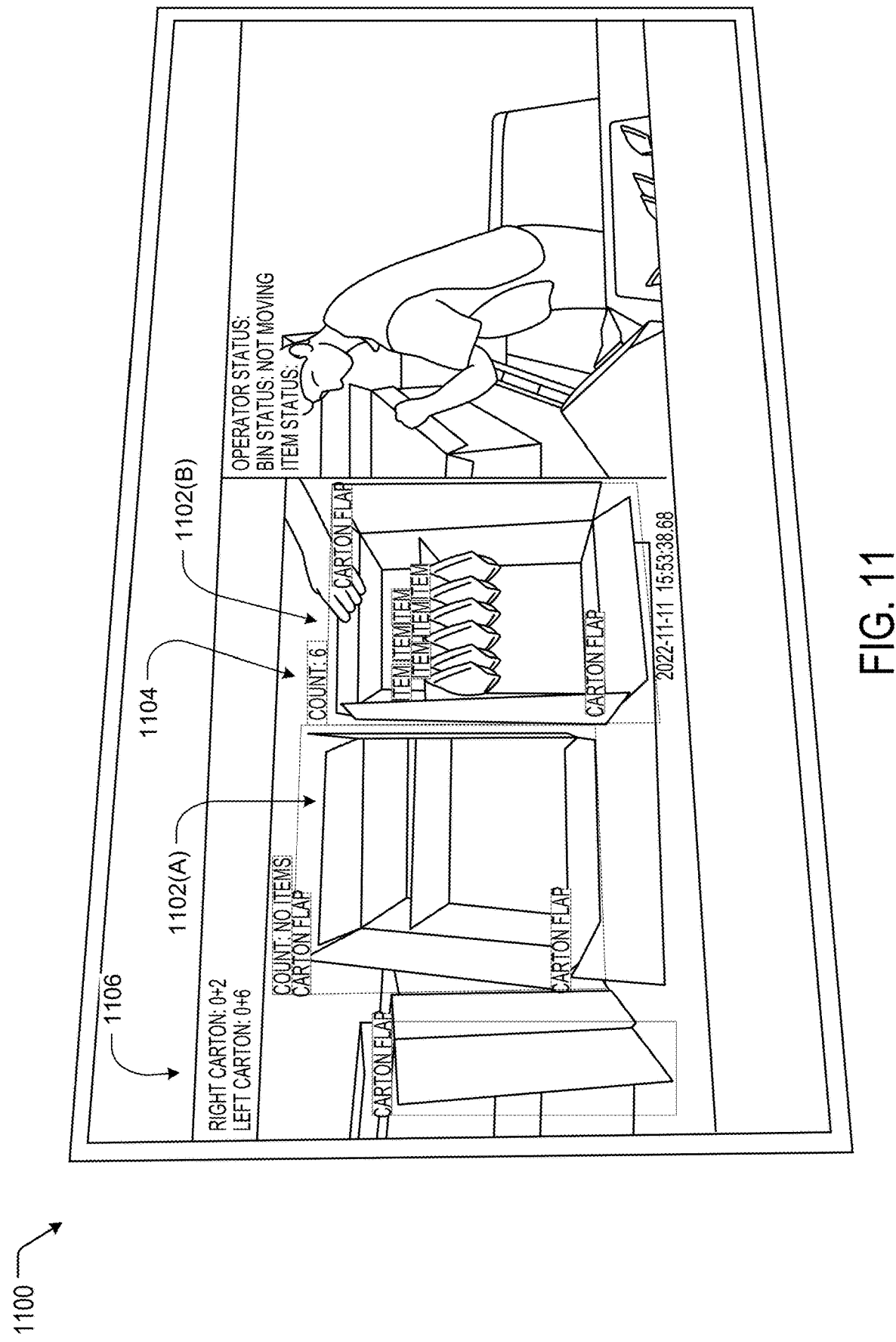
FIG. 11 is another example pictorial diagram illustrating a display associated with a packing area including multiple containers according to some implementations.

FIG. 11 is another example pictorial diagram illustrating a display associated with a packing area including multiple containers according to some implementations. In the current example, the system may display regions 1102 associated with each container. The display 1100 may also present a count 1104 of each item placed in the container and a running quantity or count 1106 of each carton or container as illustrated.

Figure 12:
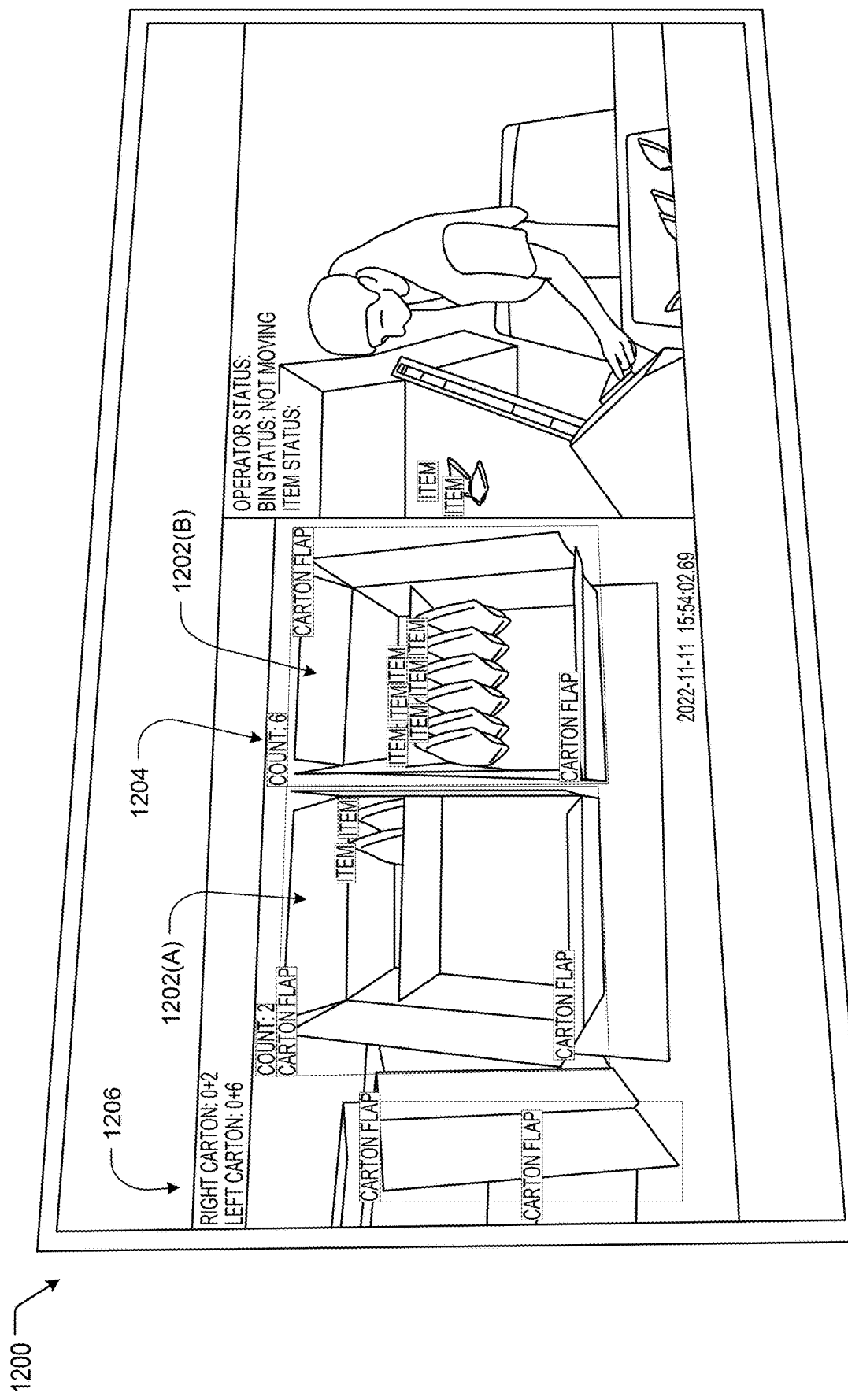
FIG. 12 is another example pictorial diagram illustrating a display associated with a packing area including multiple containers according to some implementations.

FIG. 12 is another example pictorial diagram illustrating a display associated with a packing area including multiple containers according to some implementations. In the current example, the system may display regions 1202 associated with each container. The display 1200 may also present a count 1204 of each item placed in the container and a running quantity or count 1206 of each carton or container as illustrated.

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

receiving first image data of a packing event occurring in a packing area, the packing event including at least a first item and at least a first container and a second container;

determining, based at least in part on the first image data, that the first item was not placed in the first container by an agent;

determining, based at least in part on the first image data, that the first item was placed in the second container by the agent;

sending a first alert to the agent, the first alert notifying the agent to repack the first item, the first alert including an indication of the second container that the first item was placed in;

receiving second image data of the packing event occurring in the packing area, the second image data including at least the first container and the second container;

determining, based at least in part on the second image data, that the first item was repacked in the first container by the agent; and sending a second alert to the agent, the second alert notifying the agent to proceed with a next item.

2. The method of claim 1, further comprising:

receiving third image data of the packing event occurring in the packing area, the third image data including a second item;

determining, based at least in part on the third image data, that the second item was not placed in the first container by the agent;

sending a third alert to the agent, the third alert notifying the agent to repack the second item;

receiving fourth image data of the packing event occurring in the packing area;

determining, based at least in part on the fourth image data, that the second item was not retrieved and placed in the first container by the agent;

sending a fourth alert to the agent, the fourth alert re-notifying the agent to repack the second item;

receiving fifth image data of the packing event occurring in the packing area; and determining, based at least in part on the fifth image data, that the second item was retrieved and placed in the first container by the agent; and sending a fifth alert to the agent, the fifth alert notifying the agent to proceed with a next item.

3. The method of claim 1, wherein:

determining that the first item was not placed in the first container by the agent further comprises inputting the first image data into a one or more first machine learning models and receiving as an output of the one or more first machine learning models an indication that the first item was not placed in the first container, the one or more first machine learning models trained on first image training data of various items being placed in containers by various agents; and determining that the first item was repacked in the first container by the agent further comprises inputting the second image data into a one or more second machine learning models and receiving as an output of the one or more second machine learning models an indication that the first item was placed in the first container, the one or more second machine learning models trained on second image training data of various items being placed in containers by various agents.

4. The method of claim 3, wherein the one or more first machine learning models includes:
one or more machine learning models to segment the first image data and generate segmented image data;
one or more machine learning models to classify the segmented image data and generate classified image data; and
one or more machine learning models to determine a packing location based at least in part on the classified image data.

5. The method of claim 1, wherein the first alert causes a display associated with the packing area to provide a visual indication that the first item was not placed in the first container.

6. The method of claim 5, further comprising
causing an image to be presented on a display associated with the packing area, the image including:
a visual representation of the first container;
a visual representing each of the items placed in the first container; and
a visual representation of a status of the agent.

7. The method of claim 1, wherein:
the agent is an autonomous system;
the first alert is a first control signal to cause the autonomous system to perform an action associated with the first item; and
the second alert is a second control signal to cause the autonomous system to perform an action associated with another item.

8. The method of claim 1, further comprising:
determining, based at least in part on the first image data, a class associated with the first item; and
determining, based at least in part on the class of the first item, that the first item belongs in the first container.

9. The method of claim 1, wherein the first alert is presented on a display associated with the packing area, the first alert presented concurrently with a first display portion representing the first container associated with the packing event and a second display portion representing the agent associated with the packing event, the first display portion including an indication or an expected number of items to be placed in the first container, a detected number of items placed in the first container, a label identifying each item placed in the first container, and a label identifying a first portion of the first container and the second display portion including an operator status and a bin status.

10. A method comprising:
sending a first alert to a display associated with an agent engaged in a packing event including a first container and a second container, the first alert to indicate that a first item was packed incorrectly in the first container, the display presenting concurrently with the first alert a first display portion representing the first container and a second display portion representing the agent, the first display portion including an indication or an expected number of items to be place in the first container, a detected number of items placed in the first container; a label identifying each item placed in the first container, and a label identifying a first portion of the first container and the second display portion including an operator status and a bin status;
receiving, from an image device, first image data of the packing event occurring in the packing area and including at least the first container and the second container;
determining, based at least in part on the first image data, that the first item was repacked correctly in the second container by the agent; and
sending a second alert to the display, the second alert notifying the agent to proceed with a next item.

11. The method of claim 10, further comprising:
receiving, from the image device, second image data of the packing event occurring in the packing area, the second image data received prior to sending the first alert; and
determining, based at least in part on the second image data, that the first item was packed incorrectly in the first container by the agent.

12. The method of claim 11, wherein determining that the first item was packed incorrectly in the first container by the agent further comprises:
determining, based at least in part on the second image data, segmented and classified image data, the segmented and classified image data including data representing a class associated with the first item and data associated with the first container and the second container;
generating, based at least in part the data associated with the first container and the second container, a pixel mapping representing the packing area, the pixel mapping including a first pixel region associated with the first container and a second pixel region associated with the second container;
determining, based at least in part on the pixel mapping and the segmented and classified image data, an area location associated with the pixel mapping and a placement of the first item; and
determining, based at least in part on the area and the pixel mapping, that the first item was placed in the first container by the agent.

13. The method of claim 10, wherein determining that the first item was repacked correctly in the second container by the agent further comprises:
determining, based at least in part on the first image data, segmented and classified image data, the segmented and classified image data including data representing a class associated with the first item and data associated with the first container and the second container;
generating, based at least in part the data associated with the first container and the second container, a pixel mapping representing the packing area, the pixel mapping including a first pixel region associated with the first container and a second pixel region associated with the second container;
determining, based at least in part on the pixel mapping and the segmented and classified image data, an area location associated with the pixel mapping and a placement of the first item; and
determining, based at least in part on the area and the pixel mapping, that the first item was placed in the second container by the agent.

14. The method of claim 10, wherein the first alert provides a visual indication on the display that the first item was placed in the first container.

15. A method comprising:
receiving first image data associated with a packing event occurring in a packing area, the first image data including at least a first container and a second container;
generating, based at least in part on the first image data, second image data associated with the packing event, the second image data including a first display portion representing the first container and the second container associated with the packing event and a second display portion representing the agent associated with the packing event, the first display portion including an indication or an expected number of items to be place in the first container, an expected number of items to be placed in the second container, a detected number of items placed in the first container, a detected number of items placed in the second container, a label identifying each item placed in the first container, and a label identifying a first portion of the first container and the second display portion including an operator status and a bin status;

presenting, to the agent, the second image data on a display.

16. The method of claim 15, wherein the first portion of the first container is a container flap.

17. The method of claim 15, wherein each item presented in the first display portion includes a designated color, the designated color indicating a class associated with the item.

18. The method of claim 15, wherein the second display position includes an item status.

19. The method of claim 15, further comprising:
determining that a specific item was placed correctly in the container by the agent; and
displaying an alert on the display to indicate to the agent to proceed with a next item.

20. The method of claim 15, further comprising:
determining that a specific item was placed incorrectly with respect to the first container by the agent; and
displaying an alert on the display to indicate to the agent to re-pack the specific item.

* * * * *